Jan. 19, 1965  H. BALLUFF  3,166,273
METHOD AND APPARATUS FOR PROPULSION AND
DIRECTIONAL CONTROL OF WINGED AIRCRAFT
Filed Sept. 17, 1962  4 Sheets-Sheet 4
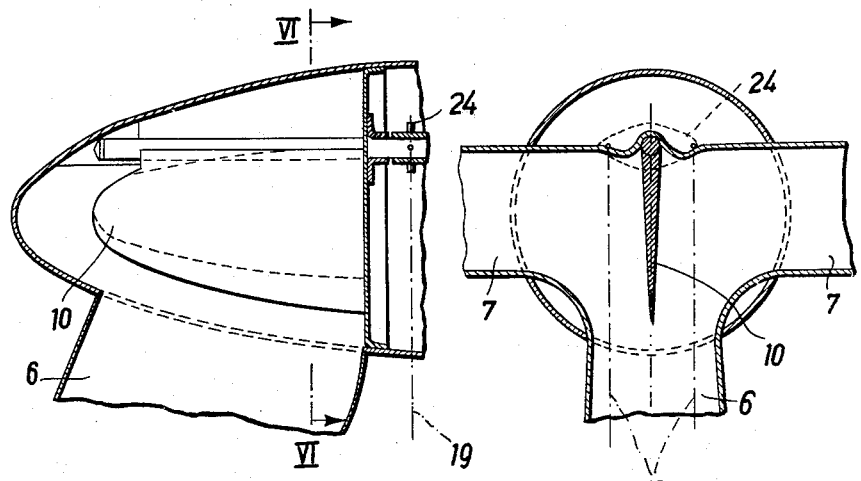
Fig. 5
Fig. 6
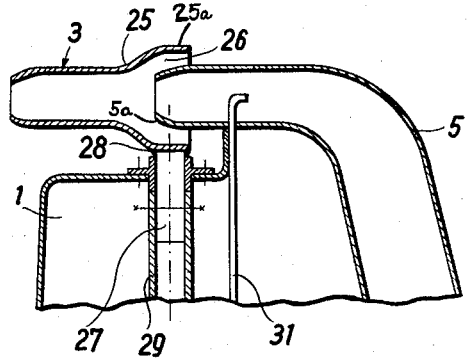
Fig. 7
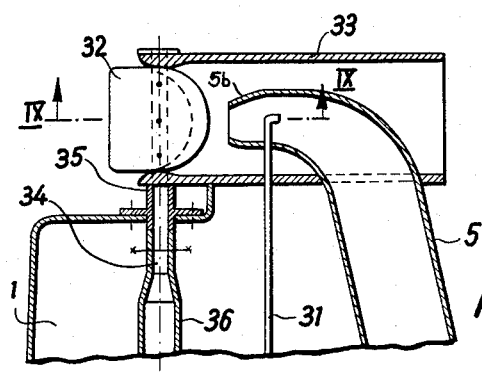
Fig. 8
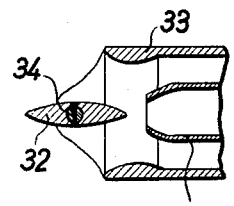
Fig. 9
INVENTOR:
Helmut Balluff
By
Werner W. Kleeman
Attorney United States Patent Office 3,166,273
Patented Jan. 19, 1965

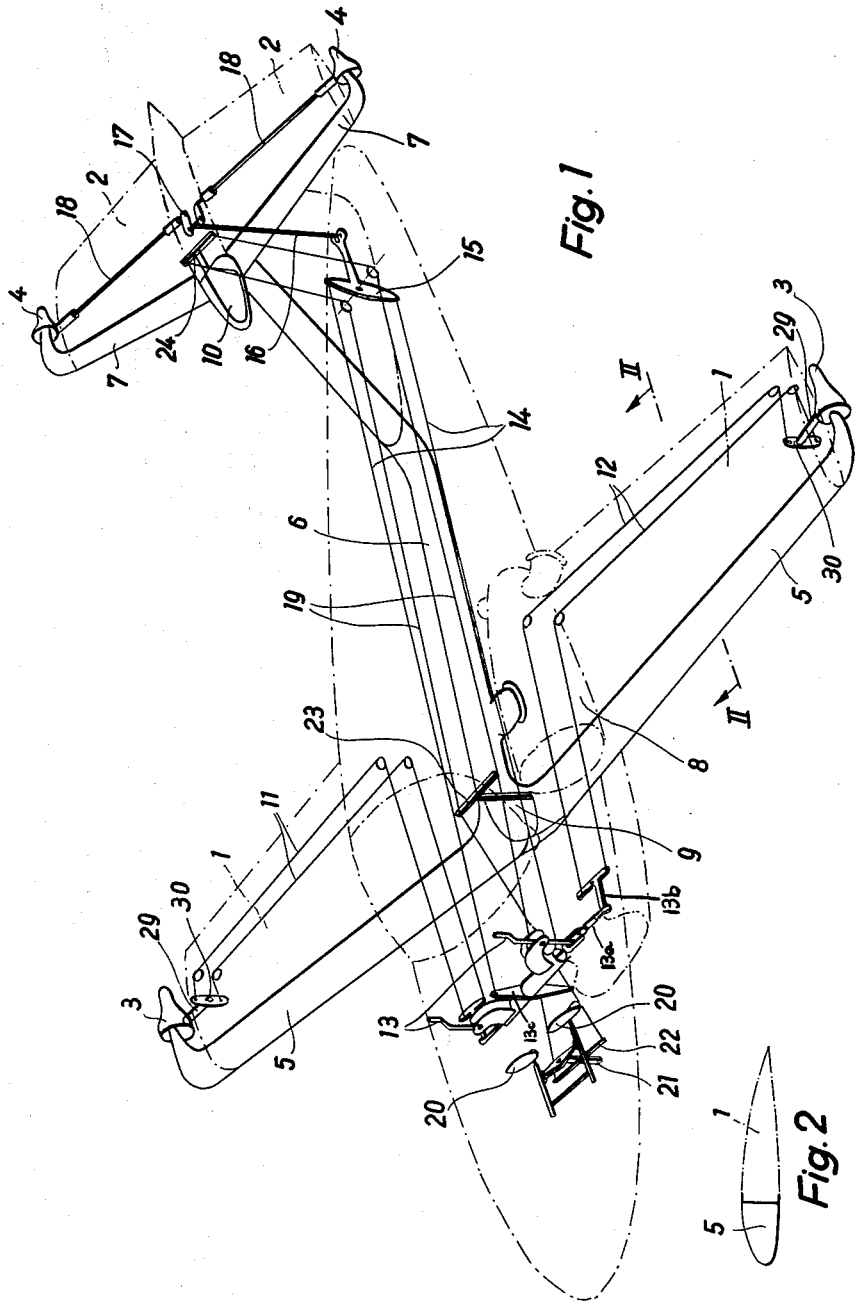

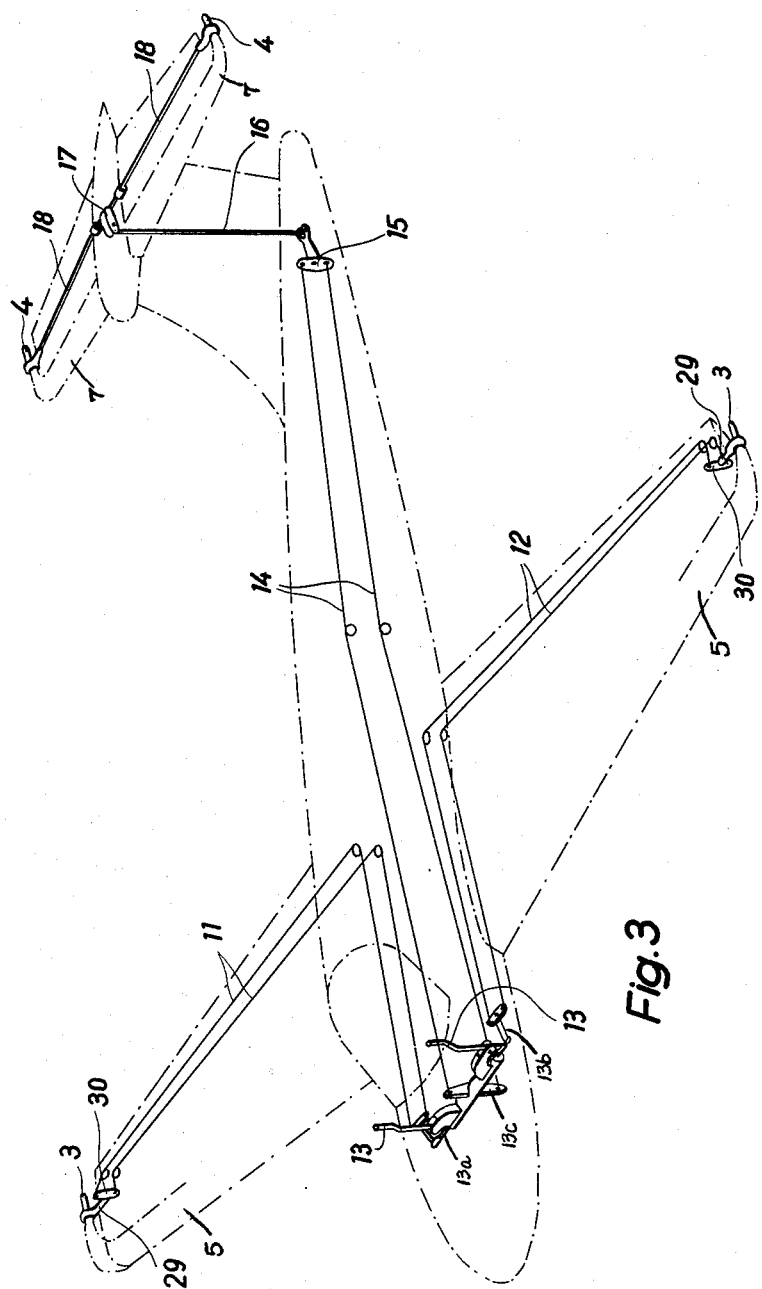

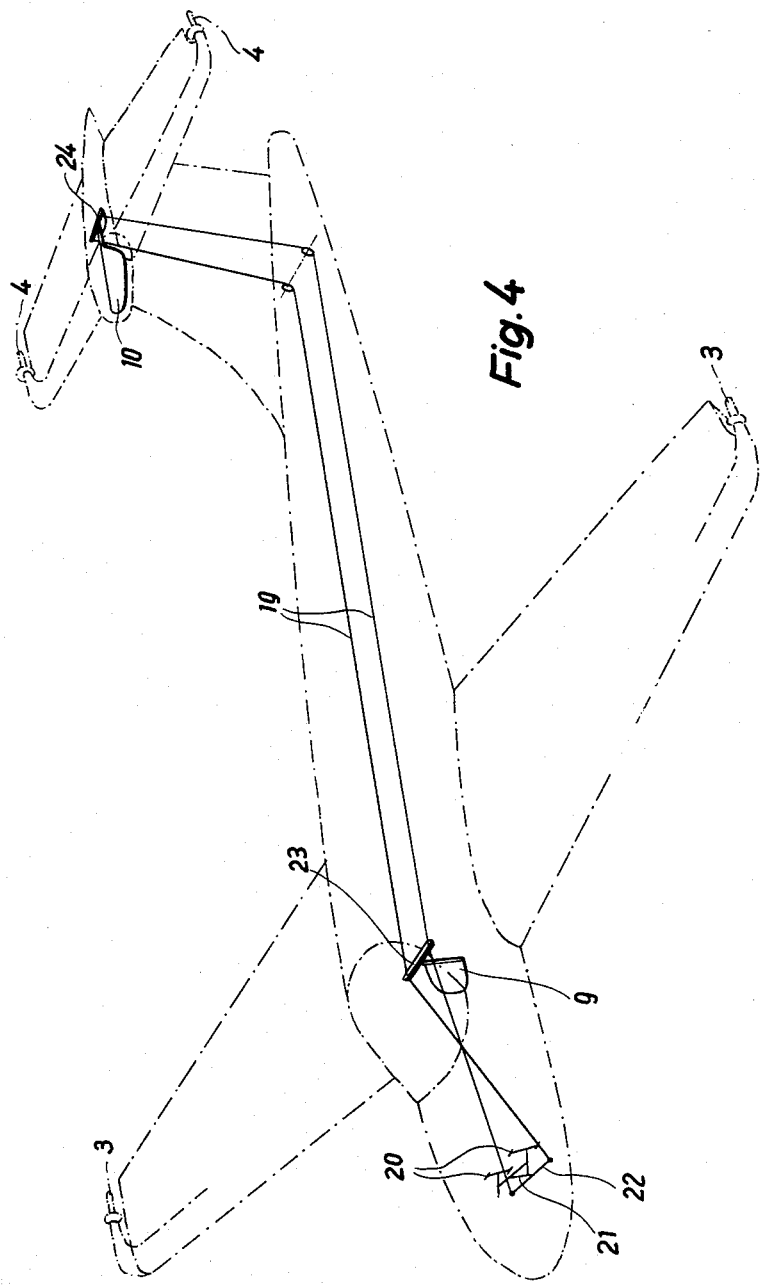

3,166,273
METHOD AND APPARATUS FOR PROPULSION AND DIRECTIONAL CONTROL OF WINGED AIRCRAFT
Helmut Balluff, Donauworth, Germany, assignor to Siebelwerke-ATG G.m.b.H., Donauworth, Germany, a corporation of Germany
Filed Sept. 17, 1962, Ser. No. 223,986
Claims priority, application Germany, Mar. 3, 1962, S 78,326
21 Claims. (Cl. 244—52)

The present invention relates to improved method and apparatus for directionally controlling winged aircraft about its three axes. More specifically, the apparatus for directionally controlling winged aircraft about its three axes, comprises control nozzles which are disposed on the aircraft and which are fed by the gas turbines thereof or by one or more special compressors. These control nozzles are capable of controlling the aircraft in accordance with the reaction principle.

Devices of this type have heretofore been employed with winged aircraft but only in conjunction with the otherwise conventional control surfaces, such as ailerons, rudders and elevators. In such instances, they are employed only to control the winged aircraft during a take-off and landing operation, during which time the flying speed is not always sufficient to ensure for the full efficiency of the control surfaces. It is to be appreciated that in such prior art devices the control nozzles are not operated apart from the take-off and landing operation. Accordingly, for this reason the control nozzles heretofore known for winged aircraft, are specially arranged for take-off and landing operations.

The provision of such control nozzles in addition to the aerodynamic control surfaces previously generally used alone in winged aircraft, not only entails increased expense but also brings with it an increase in weight and complicated maintenance of the entire aircraft. Furthermore, as will be readily evident, a double control system, that is, one for take-off and landing operations and one for normal flight, is very expensive.

Accordingly, it is a primary object of the present invention to overcome these disadvantages and, more specifically, to provide an improved method and apparatus for the directional control of winged aircraft which can be utilized in all phases of flight and will serve as the only control means for the aircraft.

A further important object of the present invention is to provide an improved method and apparatus for controlling the movement of winged aircraft about its three axes in a highly reliable and efficient manner, and which permits for reduction in cost and maintenance over heretofore known systems.

Still a further important object of the present invention is to provide an improved device for directionally controlling winged aircraft which can be employed throughout all phases of flight, thereby no longer requiring the use of conventional heretofore employed aerodynamic control surfaces.

Another important object of the present invention is to provide an improved control system for directionally controlling winged aircraft about its three axes, which system is relatively lightweight in construction, easy to service, and highly reliable and safe in operation.

A further important object of the present invention is to provide an improved method for directionally controlling winged aircraft about its three axes during all phases of flight, and which operates according to the reaction principle.

Thus, to this end, the present invention is featured in the provision of control nozzles which constitute the sole control means for the aircraft. The control nozzles are disposed on the aircraft wings, the rigid tail unit thereof and/or its fuselage tail end, and are arranged so as to control or deflect the propulsive jets emerging therefrom. It has been found that when the jet control system according to the present invention is employed as the sole control system for the aircraft, it is quite sufficient to enable the winged aircraft to be steered with adequate security and accuracy in all phases or stages of flight.

A further very important concept of the invention resides in the feature that, the control nozzles located at the wings, the rigid tail unit and/or the fuselage tail end are preferably impinged by a common or single power plant aggregation and are constructed and controllable in such a manner that these control nozzles also serve for providing flight sustaining thrust such as for forward flight, altitude control and, if desired, also for braking of the aircraft.

The preferred arrangement of a single or common power plant aggregation provides an especially favorable and advantageous economic solution for aircraft manufacture, further bringing about a considerable saving-in-weight which is of cardinal importance for aircraft design. The gas streams from the single power plant aggregation can be delivered continually to all control nozzles since all of these nozzles can bring about the various desired flight maneuvers, depending upon, of course, the selective mode of control imparted to the various nozzles and, therefore, can always be in action. As a result, these control nozzles as well as also the driving or propulsion units of the single power plant aggregation can operate continuously at full power and are thereby continually completely equalized in load. Moreover, the number of nozzles can be reduced to the extreme extent, and the same holds true for the number of propulsion units of the power plant aggregation, since no special separate nozzles or power unit are required on the one hand for thrust (forward flight for example), and on the other hand for the maneuver control or the aerodynamic lift of the aircraft. It will thus be understood that the aforesaid control nozzles of the subject invention fulfill a dual purpose.

Additionally, the directional control system designed according to the present invention provides further advantages. Thus, for example, by virtue of the elimination of the heretofore conventional control surface system, there is eliminated the oscillation of the aircraft wing or tail surfaces which carried such control surface, and which vibrations are frequently caused by such control system. With the present day high speeds of winged aircraft, it is no longer necessary to take into account the control action when the speed of sound (sound barrier) is reached, since with the control system according to the invention the control effect remains unchanged at any speed. Furthermore, the control device of the present invention is fully operative even when the aircraft goes into a spin.

In preferred manifestation of the direction control device embodying the present invention, the control nozzles for changing the direction of the propulsive jets are pivotally mounted on the wings, the rigid tail unit, and/or the tail end of the aircraft fuselage. It is to be understood and appreciated that the control nozzles could also be rigidly arranged on the aircraft and be provided with jet deflection devices, for example, in the form of one or more flaps or deflection means arranged at the jet outlet of each nozzle, for the purpose of changing the flow direction of the emanating propulsive jets.

It is also advantageous if all or some of the control nozzles, while maintaining their full control action, can be directed in the same direction, either downwardly in order to increase the aircraft lift, or forwardly in order to decelerate the aircraft. The pipelines or conduits for the pressurized gaseous medium leading to the control nozzles may extend in the profile or streamlined section of the wings or tail unit, or may themselves be constructed as a streamlined section. In this manner there is simultaneously achieved the result that icing-up of the wings or tail unit is prevented or considerably eliminated.

Briefly stated, the method of the present invention for directionally controlling winged aircraft is featured in the steps of producing a supply of gaseous medium which is to serve as the propulsive jets for the control system. This supply of gaseous medium is then directed to various exit locations provided on the aircraft, and the flow and direction of efflux of said gaseous medium as a propulsive jet from said aircraft is adjustably controlled, whereby it is possible to provide for effective and reliable directional control of said aircraft about its three axes, without employing conventional control surfaces as previously described. Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a diagrammatic, perspective view, of a winged aircraft incorporating an embodiment of the jet control system according to the present invention;

FIGURE 2 is a cross-sectional view through the wing, taken along lines II—II of FIGURE 1;

FIGURE 3 is a view similar to FIGURE 1, but illustrating only those parts of the control system which are provided for pivoting the control nozzles in order to control the aircraft about the longitudinal and transverse axes (transverse and altitude control);

FIGURE 4 is a similar view but showing only those parts of the control system provided for controlling the aircraft about the vertical axis (yaw or lateral control);

FIGURE 5 is an enlarged view, illustrating a cross-sectional, side elevation of a portion of the rigid tail unit of the aircraft including the control flap;

FIGURE 6 is a vertical, sectional view through the tail unit, taken along the lines VI—VI of FIGURE 5;

FIGURE 7 is a horizontal, cross-sectional view, showing the details of one of the pivotal control nozzles provided on the ends of the wings.

FIGURE 8 is a view similar to FIGURE 7 but illustrating a modification, wherein a control nozzle is rigidly secured to a wing and is provided with means for deflecting the propulsive jet emanating from the rigid control nozzle; and FIGURE 9 is a vertical, cross-sectional view, taken through the control nozzle arrangement shown in FIGURE 8 along lines IX—IX thereof.

Referring now to the drawings, and more particularly to FIGURES 1-4, it is to be appreciated that the winged aircraft shown therein has no conventional control surfaces such as ailerons, rudder and elevators. A control system operating in accordance with the reaction principle is its only means of directional control. At the end of each wing 1 and each horizontal tail plane surface 2 there is provided a control nozzle 3, 4 fed from a gas turbine 8 of the aircraft through the intermediary of pressure gas conduits 5, 6 and 7. The pressure gas may be taken, in the form of cold or hot air, from a point after the compressor or after the combustion chamber of the gas turbine 8 of the aircraft, and then fed to the pressure gas conduits 5, 6 and 7. Alternatively, it is to be appreciated that such pressure gas may be produced in separate compressors which serve as a supply source.

In order to control the aircraft laterally about its vertical axis (yaw) control flaps 9 and 10 are provided at the respective junction or branch-off points, of the pressure gas conduit 5 of the wings 1 and of the pressure gas conduit 7 of the tail plane surfaces 2, from the pressure gas conduit 6 in the aircraft fuselage (see FIGURES 1, 5 and 6). Depending upon the position into which the control flaps 9 and 10 are pivoted, they either completely free, or partially or completely block, the gas pressure conduits 5, 7 associated with the nozzles 3, 4 at the left-hand or right-hand wing surfaces 1 or tail unit surface 2.

The control nozzles 3, 4 arranged at the ends of the wings 3 and tail unit 2 are appropriately mounted so as to be pivotable about a respective horizontal axis. The details regarding possible ways to so mount these nozzles will be explained more fully hereinafter, and specifically with reference to the description of FIGURES 7-9. Depending upon the degree of pivoting of the control nozzles 3, 4, the aircraft can be controlled as to height about its horizontal transverse axis (pitch), or can be controlled transversely about its longitudinal axis (roll).

A special mechanism which, in the illustrated embodiment, embodies lever-operated cables, is employed to adjust the control flaps 9, 10 and pivot the control nozzles 3, 4. FIGURE 3 clearly shows the arrangement of the cables 11, 12 and 14 for pivoting the control nozzles 3, 4, whereas FIGURE 4 illustrates the cables 19 for pivoting the control flaps 9, 10. By specifically referring to FIGS. 1 and 3, it will be recognized that the pivotable nozzles 3 mounted on the wings 1 are operated by cables 11, 12 or other suitable expedients connected to the usual control column 13 through the agency of a suitable linkage system 13a including pivotable lever means 13b. On the other hand, pivotable nozzles 4 mounted on the tail unit 2 are controlled by cables 14 connected at one end to a lever member 13c, which cables 14 are also controlled by the control column 13 and are connected at their other ends to a bell-crank lever 15. By means of this bell-crank lever 15 which is operatively connected with one end of a push rod 16, said push rod is moved up and down. By virtue of this movement of the push rod 16 there is produced a corresponding rotation of the drive shafts or rods 18 provided for the pivotable nozzles 4 by way of the rocking levers 17, with said nozzles being suitably connected to the drive shafts 18 so as to rotate therewith.

The control flaps 9 and 10 disposed in the pressure gas conduits 5–7 are jointly pivoted by additional cables 19 connected to pedals 20. The two pedals 20 are each mounted so as to be pivotable in opposite directions to one another about their bottom end. Thus, when one or the other pedal is depressed there is carried out a rotation of a vertical spindle 21, and hence, a corresponding pivoting movement of a rocking lever 22 which is operatively connected to said spindle, and to the diametrically opposed ends of which rocking lever there are connected the ends of the cables 19, as best ascertained by inspecting FIGURE 4.

Depending upon the degree of pivoting of the rocking lever 22, a rocking lever 23 provided for the control flap 9 is pivoted in a substantially horizontal plane through the agency of said cables 19, whereas a rocking lever 24 for the control flap 10 is pivoted in a substantially vertical plane via said cables. In consequence thereof, the control flap 9 is caused to pivot about its vertical axis and the control flap 10 to pivot about its horizontal axis. Depending upon the degree of pivoting of these control flaps 9, 10, the two pressure gas conduits 5 and 7 are opened to varying amounts, and hence, the control nozzles 3, 4 communicating with these conduits are fed at different rates. The aircraft is thus controlled about its vertical axis. When the aircraft is flying on a straight course (horizontal flight, climbing or gliding), the two control flaps 9, 10 are located in their central or neutral position, in which they completely free the pressure gas conduits 5 and 7 at the two sides of the aircraft. Under such condition, all of the nozzles 3, 4 are thus operating with full feed so that a full thrust effect is obtained for the aircraft.

The deflections or movements of the control column 13 or pedals 20 correspond to those of the control surface systems heretofore conventional in winged aircraft, so that no further discussion thereof appears to be necessary. It is further to be understood and appreciated that, electrical, pneumatic or hydraulic devices may alternatively be employed to pivot the control nozzles 3, 4 and the control flaps 9, 10, in lieu of the cables 11, 12, 14 and 19. By means of a special operating lever (not shown) all of the nozzles 3, 4 may be so shifted or displaced that, for example, on take-off or landing, they assist the coefficient of lift, particularly in the case of vertical or short take-off aircraft. By having imparted thereto an appropriate construction, this operating lever may also be adapted to pivot the nozzles 3, 4 forwardly in the direction of flying, so that the propulsive jets emerge from said nozzles in the same direction as the direction of flight, and hence, exert a braking action on landing, or if it is otherwise required to reduce the flying speed of the aircraft for some other reason. For such purpose, the control nozzles 3, 4 may, for example, be operatively connected with the associated pressure gas conduits 5, 7 through the intermediary of flexible hose members of known construction, and for such reason not further shown, so that the required degree of freedom of movement of the control nozzles is possible.

In order to further increase the efficacious action of the nozzles 3, 4, they may each comprise a tubular element 25, as shown in FIGURE 7, the rear widened region 25a of which surrounds the outlet end 5a of the pressure gas conduit 5, and is in spaced relation with respect thereto. While for clarity in explanation and illustration, the nozzle structure shown in FIGURE 7, has specific reference to the control nozzles 3, it will be appreciated that the nozzles 4 could be likewise constructed. Between the widened end 25a of the nozzle tube 25 and the outlet end 5a of the pressure conduit 5 there is formed an annular entry gap 26 through which the interior of the nozzle tube 25 communicates with atmosphere. A suction or venturi effect results at the annular gap 26 due to the high-speed flow of the gas from the pressure gas conduits 5, 7, and this effect is assisted by the slipstream. Such a construction with an annular suction gap 26 has the great advantage that no special pivotable or resilient sealing zones are required between the respective pressure gas conduits 5, 7 and the associated pivotal control nozzles 3, 4, and such nozzles are cooled by the external air drawn into the gap 26.

The pivotable nozzle 25 constructed in the manner described, is fastened onto a pivot or turning pin 27 extending through a bearing sleeve 28 provided on the wing 1 or tail plane 2 of the aircraft and secured inside a hollow drive shaft 29 which can be rotated through the agency of rocking levers 30 by means of the cables 11, 12, so that the nozzle is correspondingly pivoted by way of the associated pivot pin 27. In the illustrated embodiment of FIGURE 7, the nozzle is constructed as an afterburner, since when employing gas from the gas turbine such still contains sufficient oxygen for good combustion. For this purpose, a fuel delivery conduit or pipe 31 leads to the outlet end 5a of the pressure conduit 5 and serves, at this end of the conduit, for injection of fuel into the flow of gas entering the nozzle tube 25, with such injection being in a direction opposite to the direction of flow, so that after burning of this gas is ensured.

In the embodiment illustrated in FIGURES 8 and 9, the control nozzle is itself formed by the outlet end 5b of the pressure gas conduit 5. Since this outlet end 5b of the conduit 5 is not pivotable, there is provided a control flap 32 in order to control the propulsive jet emerging from the nozzle proper, which control flap is mounted so as to be pivotable in a jacket tube 33 which surrounds the nozzle at some distance therefrom. This jacket tube 33, which may also be provided even in the case of pivoting nozzles of the type shown in FIGURE 7, further increases the effect of the control nozzles and, in a manner similar to the annular gap 26 formed between the nozzle tube 25 and gas conduit 5, in the illustrated embodiment of FIGURE 7, also serves to ensure an additional intake of atmospheric air, and thus an increased propulsive jet.

The pivotable flap 32 for pivoting or deflecting the propulsive jet may be secured to a pivot or turning pin 34, in a manner similar to the mounting of the pivotable nozzle 25 described in the embodiment appearing in FIGURE 7. The pivot pin 34 extends through a bearing bush 35 provided on the wing or tail plane 1 or 2, respectively, and is secured inside a hollow drive shaft 36 which, in the same manner for example as the drive shaft 29 of FIGURE 7, can be rotated by the cables 11, 12 through the agency of the rocking lever 30. Naturally, the nozzles 4 on the tail plane 2 and operated by cables 14 may be similarly constructed and mounted.

The pressure gas conduits 5, 6 and 7 leading from the gas turbine 8, or from one or more separate compressors, to the control nozzles 3, 4 are constructed as streamlined sections of the wing or tail plane (see FIGURE 2 in particular), in the illustrated embodiment shown in FIGURES 1, 2, 3 and 4, insofar as said conduits extend inside the wing or tail plane surfaces. In this manner, there is achieved the effect that the cold or hot air flowing in the gas conduits and supplied from the gas turbine 8 or the compressors, heat up the streamlined sections of the wings or tail plane surfaces, and thus, protect these surfaces from any danger of icing.

Having thus described the present invention, what is desired to be secured by United States Letters Patent is:

1. A method of propelling and directionally controlling winged aircraft about its three axes, comprising the steps of: producing a supply of gaseous medium at a single power plant aggregation, feeding said gaseous medium to predetermined exit locations on said aircraft, and controlling the feed of said gaseous medium to said exit locations and the direction of efflux of said gaseous medium from said exit locations, in order to provide flight sustaining thrust for at least forward movement and lift of the winged aircraft as well as to directionally control said winged aircraft about its three axes during all phases of flight solely by means of the gaseous medium emanating from said exit locations, said step of controlling including directing said efflux of gaseous medium forwardly in the direction of flight at least at some of said exit locations, whenever it is desired to decelerate said aircraft.

2. A method of propelling and directionally controlling winged aircraft about its three axes, comprising the steps of: producing a supply of gaseous medium from a single power plant aggregation, feeding said gaseous medium to nozzle members providing flight sustaining thrust for at least lift and forward motion of the winged aircraft as well as control thereof and which are arranged at predetermined locations on said aircraft, and controlling the feed of said gaseous medium to said nozzle members and the direction of efflux of said gaseous medium from said nozzle members, in order to provide such flight sustaining thrust as well as also to directionally control said aircraft about its three axes during all phases of flight solely by means of the aforesaid nozzle members, said steps of controlling including pivoting said nozzle members to control the direction of efflux of said gaseous medium and deflecting said gaseous medium emanating from said nozzle members to control the direction of efflux of said gaseous medium.

3. A system serving for both propulsion and directionally controlling winged aircraft about its three axes, comprising control nozzles disposed on the aircraft, a common supply means incorporating a single power plant aggregation for supplying gaseous medium to said control nozzles for efflux as propulsive jets therefrom, said control nozzles controlling said aircraft on the reaction principle and providing propulsive jets for flight sustaining thrust for at least lift and forward motion of said winged aircraft as well as defining the sole control means for directionally controlling said aircraft about its three axes, and means for controlling the feed of said propulsive jets emerging from said control nozzles, at least a portion of said control nozzles being disposed on the wings and a tail unit.

4. A system for both propelling and directionally controlling winged aircraft about its three axes, said aircraft being of the type having wings, a tail unit and fuselage; comprising control nozzles disposed on the aircraft, a single power plant aggregation means for supplying gaseous medium to said control nozzles for efflux as propulsive jets therefrom, said control nozzles controlling said aircraft on the reaction principle and providing propulsive jets for flight sustaining thrust for at least lift and forward motion of the winged aircraft as well as serving as the sole control means for directionally controlling said aircraft about its three axes, and means for controlling the feed and direction of efflux of said propulsive jets emerging from said control nozzles, at least a portion of said control nozzles are disposed on said wings and said tail unit.

5. A system for both propelling and directionally controlling winged aircraft according to claim 4; wherein at least a portion of said control nozzles are disposed on the fuselage tail end.

6. A system for both propelling and directionally controlling winged aircraft about its three axes, said aircraft being of the type having wings, a tail unit and fuselage; comprising control nozzles disposed on the aircraft, a single power plant aggregation means for supplying gaseous medium to said control nozzles for efflux as propulsive jets therefrom said control nozzles controlling said aircraft on the reaction principle and providing propulsive jets for flight sustaining thrust for at least lift and forward motion of the winged aircraft as well as serving as the sole control means for directionally controlling said aircraft about its three axes, and means for controlling the feed and direction of efflux of said propulsive jets emerging from said control nozzles, wherein at least two control nozzles being associated with each axis of the aircraft, with said controlling means being operable on said control nozzles associated with each axis to feed gaseous medium thereto at different feed intensity and to deliver propulsive jets extending in different directions.

7. A system for both propelling and directionally controlling winged aircraft according to claim 4; wherein said control nozzles are provided with jacket means for admitting atmosphere air.

8. A system for both propelling and directionally controlling winged aircraft about its three axes, said aircraft being of the type having wings, a tail unit and fuselage; comprising control nozzles disposed on the aircraft, a single power plant aggregation means for supplying gaseous medium to said control nozzles for efflux as propulsive jets therefrom said control nozzles controlling said aircraft on the reaction principle and providing propulsive jets for flight sustaining thrust for at least lift and forward motion of the winged aircraft as well as serving as the sole control means for directionally controlling said aircraft about its three axes, and means for controlling the feed and direction of efflux of said propulsive jets emerging from said control nozzles, means cooperating with said control nozzles such that they operate as afterburners.

9. A system for both propelling and directionally controlling winged aircraft according to claim 4; including means mounting said control nozzles for pivotable movement, said controlling means cooperating with said mounting means to adjustably pivot said control nozzles to regulate the direction of efflux of said emerging propulsive jets.

10. A system for both propelling and directionally controlling winged aircraft according to claim 9; said mounting means being arranged such that said control nozzles are pivotable about horizontal axes.

11. A system for both propelling and directionally controlling winged aircraft according to claim 10; wherein said mounting means permit said control nozzles to be pivoted downwardly to increase the aircraft lift or forwardly to decelerate the aircraft, while the full control effect of said control nozzles is maintained.

12. A system for both propelling and directionally controlling winged aircraft about its three axes, said aircraft being of the type having wings, a tail unit and fuselage; comprising control nozzles disposed on the aircraft, a single power plant aggregation means for supplying gaseous medium to said control nozzles for efflux as propulsive jets therefrom, said control nozzles controlling said aircraft on the reaction principle and providing propulsive jets for flight sustaining thrust for at least lift and forward motion of the winged aircraft as well as serving as the sole control means for directionally controlling said aircraft about its three axes, and means for controlling the feed and direction of efflux of said propulsive jets emerging from said control nozzles, said control nozzles being mounted to be stationary on said aircraft.

13. A system for both propelling and directionally controlling winged aircraft according to claim 12; wherein said controlling means include deflection means cooperating with said stationary control nozzles to regulate the direction of efflux of said emerging propulsive jets.

14. A system for both propelling and directionally controlling winged aircraft about its three axes, said aircraft being of the type having wings, a tail unit and fuselage; comprising control nozzles disposed on the aircraft, a single power plant aggregation means for supplying gaseous medium to said control nozzles for efflux as propulsive jets therefrom, said control nozzles controlling said aircraft on the reaction principle and providing propulsive jets for flight sustaining thrust for at least lift and forward motion of the winged aircraft as well as serving as the sole control means for directionally controlling said aircraft about its three axes, and means for controlling the feed and direction of efflux of said propulsive jets emerging from said control nozzles, said single power plant aggregation means for supplying said gaseous medium including channel members having outlet end portions in registry with said control nozzles.

15. A system for both propelling and directionally controlling winged aircraft according to claim 14; wherein said channel members extend inside of the streamlined sections of said wings and tail unit and are arranged at the respective leading edge thereof.

16. A system for both propelling and directionally controlling winged aircraft according to claim 14; wherein said channel members are constructed as streamlined sections.

17. A system for both propelling and directionally controlling winged aircraft according to claim 14; wherein said controlling means include control flap means disposed in said channel members for regulating the feed of gaseous medium to said control nozzles.

18. A system for both propelling and directionally controlling winged aircraft according to claim 17; wherein said control flaps cooperate with said channel means such that control nozzles situated at opposite sides of the longitudinal axis of said aircraft are fed with said gaseous medium at different intensities, for change of direction about the vertical axis of said aircraft.

19. A system for both propelling and directionally controlling winged aircraft according to claim 14; wherein said control nozzles each comprise a tubular element including a widened rear end portion circumjacent said outlet end portion of an associated channel member and spaced therefrom to define an annular air gap for receipt of drawn-in air.

20. The combination with aircraft of the type provided with wings, tail unit and fuselage, of a system for the propulsion and directional control of said aircraft about its three axes, which system comprises: control nozzles disposed on the aircraft, a single power plant aggregation means for supplying gaseous medium to said control nozzles for efflux as propulsive jets therefrom serving for both propulsion and directional control of said winged aircraft, said single power plant aggregation means including channel means communicating with said control nozzles, said control nozzles controlling said aircraft on the reaction principle and providing flight sustaining thrust for at least lift and forward motion of said winged aircraft as well as defining the sole control means for said aircraft, means for controlling said propulsive jets emerging from said nozzles, said controlling means including means cooperating with said channel means to adjustably control the flow of gaseous medium to each of said control nozzles and further means cooperating with each of said control nozzles to adjustably control the direction of efflux of said propulsive jets.

21. A system for both propelling and directionally controlling winged aircraft about its three axes, said aircraft being of the type having wings, a tail unit and fuselage; comprising control nozzles mounted to be stationary on the aircraft, means for supplying gaseous medium to said stationary control nozzles for efflux as propulsive jets therefrom, said stationary control nozzles controlling said aircraft on the reaction principle and providing propulsive jets for flight sustaining thrust for at least lift and forward motion of the winged aircraft as well as serving as the sole control means for said aircraft, and means for controlling the feed and direction of efflux of said propulsive jets emerging from said stationary control nozzles, said controlling means including deflection means cooperating with said stationary control nozzles to regulate the direction of efflux of said emerging propulsive jets, jacket means for pivotably supporting said deflection means and surrounding said stationary control nozzles.

References Cited by the Examiner

UNITED STATES PATENTS

| | | | |
|---|---|---|---|
| 2,668,026 | 2/54 | Price. | |
| 2,693,079 | 11/54 | Rau | 244—74 X |
| 2,762,584 | 9/56 | Price | 244—12 |
| 2,780,424 | 2/57 | Price | 244—12 |
| 2,870,978 | 1/59 | Griffith et al. | 244—52 X |
| 2,912,188 | 11/59 | Singelmann | 244—52 X |
| 2,943,822 | 7/60 | Hamilton | 244—52 X |
| 3,114,520 | 12/63 | Finvold | 244—52 X |

FOREIGN PATENTS

| | | |
|---|---|---|
| 325,002 | 2/30 | Great Britain. |
| 480,788 | 2/52 | Canada. |
| 610,143 | 10/48 | Great Britain. |
| 968,079 | 4/50 | France. |

FERGUS S. MIDDLETON, *Primary Examiner.*